(12) United States Patent
Doak

(10) Patent No.: US 7,494,137 B2
(45) Date of Patent: Feb. 24, 2009

(54) SNOW PLOW DOLLY

(76) Inventor: Bernard A. Doak, 32 Settler's Way, Orrington, ME (US) 04474

( * ) Notice: Subject to any disclaimer, the term of this patent is extended or adjusted under 35 U.S.C. 154(b) by 622 days.

(21) Appl. No.: 11/356,665

(22) Filed: Feb. 17, 2006

(65) Prior Publication Data

US 2007/0193073 A1    Aug. 23, 2007

(51) Int. Cl.
  *B62D 61/06* (2006.01)
(52) U.S. Cl. .................. 280/62; 280/79.11
(58) Field of Classification Search .............. 280/62, 280/79.11, 79.2, 79.3, 79.7, 47.34, 47.35, 280/35, 32.5, 32.7
  See application file for complete search history.

(56) References Cited

U.S. PATENT DOCUMENTS

| 469,507 | A | * | 2/1892 | Spencer .................. 280/62 |
| 1,559,391 | A | * | 10/1925 | Waters .................. 254/7 B |
| 3,941,400 | A | | 3/1976 | Buttner |
| 4,205,825 | A | * | 6/1980 | Stanford .................. 254/420 |
| 4,572,531 | A | | 2/1986 | Elia |
| 4,799,699 | A | * | 1/1989 | Berfield et al. ............. 280/79.5 |
| 4,821,435 | A | | 4/1989 | Pester |
| 4,887,838 | A | | 12/1989 | Reppen |
| 5,050,898 | A | | 9/1991 | Petrell, Jr. |
| 5,335,923 | A | | 8/1994 | Langenback et al. |
| 5,524,917 | A | | 6/1996 | Iverson et al. |
| 5,609,461 | A | * | 3/1997 | Lichtenberg ................ 414/426 |
| D467,402 | S | * | 12/2002 | DiStaulo ...................... D34/28 |
| D503,838 | S | | 4/2005 | Archambault |

OTHER PUBLICATIONS www.quickmountplowcart.com, "Quickmount".
www.4qte.com/snowplow_carts.html, "Snow Plow Carts".
www.assoc-elec-prod.com/PBBenefits.htm, "The Plow Buddy".
www.snowplowing-contractors.com/plow_dollies.html, "Alan's Homegrown Plow Dollies".

* cited by examiner

*Primary Examiner*—Christopher P Ellis
*Assistant Examiner*—Bridget Avery
(74) *Attorney, Agent, or Firm*—Anthony D. Pellegrini, Esq.

(57) ABSTRACT

An improved snow plow dolly having a low center of gravity for improved stability when supporting a snow plow, together with front and lateral support members to retain the snow plow in place during movement.

18 Claims, 5 Drawing Sheets

SNOW PLOW DOLLY

BACKGROUND OF THE INVENTION

1. Technical Field

The invention relates generally to the field of snow plow dollies. More specifically, the invention is directed to an improved snow plow dolly employing a simple yet sturdy construction that securely retains a snow plow thereon.

2. Description of Prior Art

Snow plow dollies are well known in the art. All disclose a support frame for supporting the snow plow blade and snow plow jack, and positioning means, typically wheels but also casters, for maneuvering the snow plow blade once it has been placed on the dolly and detached from the carrying vehicle. Many also disclose adjustment means for accommodating different height snow plow jacks.

Buttner, U.S. Pat. No. 3,941,400 (Mar. 2, 1976), "Plow Dolly", discloses a triangular steel dolly supported by casters located directly beneath each corner. The snow plow blade is supported by a V-channel attached to the top of the shorter side. A horizontally and vertically adjustable snow plow jack support extends across the two remaining sides of the dolly. There are no lateral members to prevent sideways slippage of the snow plow blade or snow plow jack.

Pester, U.S. Pat. No. 4,821,435 (Apr. 18, 1989), "Snow Plow Alignment and Storage System", discloses a triangular support frame with a caster located directly beneath each corner. At one corner is a snow plowjack support which is vertically adjustable by means of a screw jack. Notches to receive the lower edge of the plow blade are located at the other two corners. There are no lateral members to prevent sideways slippage of the snow plow blade or snow plow jack.

Iverson, et al., U.S. Pat. No. 5,524,917 (Jun. 11, 1996), "Lightweight Snowplow Dolly", discloses a trapezoidal shaped snow plow dolly. Non-swiveling casters are mounted directly beneath each end of the front member, and a single swiveling caster is mounted directly beneath the center of the rear member. Two vertical guideposts extend upward from either end of the front member to prevent the snow plow blade from slipping off in a forward direction. There are no lateral members to prevent sideways slippage of the snow plow blade or snow plow jack.

Elia, U.S. Pat. No. 4,572,531 (Feb. 25, 1986), "Snow Plow Dolly", discloses a T-shaped snow plow dolly constructed of square steel tubing. The cross piece is supported by two non-swiveling wheels. Two small blade rests are mounted near the ends of the cross piece to prevent the snow plow blade from sliding off in a forward direction. The base piece is supported by a swivel caster at one end and is bolted to the base piece after insertion into a receiving socket. A plow frame support, mounted at the distal end of the base piece, is vertically adjustable, utilizing bolts. The dolly may be disassembled for each of storage. There are no lateral or front members to prevent slippage of the snow plow blade or snow plow jack.

Langenback, et al., U.S. Pat. No. 5,335,923 (Aug. 9, 1994), "Snow Plow Dolly", discloses a cross-shaped snow plow dolly, supported by a wheel at the end of each arm, the wheels located directly below the arms. An upturned C-channel supports the snow plow blade. A scissor jack supports the snow plow jack and permits height adjustments to facilitate adjusting the height of the snow plow jack. There are no lateral members to prevent slippage of the snow plow blade or snow plow jack.

Archambault, U.S. Pat. No. D503,838 (Apr. 5, 2005), "Dolly for Transporting A Plow", discloses a T-shaped snow plow dolly having wheels located directly beneath the support structure. It also discloses a small trough for cradling the bottom edge of the snow plow blade. There are no lateral members to prevent slippage of the snow plow blade or snow plow jack.

Reppen, U.S. Pat. No. 4,887,838 (Dec. 19, 1989), "Wheeled Carrier For A Snow Plow", discloses a T-shaped support frame with generally trapezoidal supports extending beyond the short base of the carrier. The plow blade rests on resilient rub strips located on the side rails. A jackscrew projecting horizontally from front edge of the long base permits height adjustment of the rearward projecting snow plow jack support. The device folds up into a compact configuration for storage when not in use. The wheels are located directly beneath the support frame. There are no lateral or front members to prevent slippage of the snow plow blade or snow plow jack.

Petrell, Jr., U.S. Pat. No. 5,050,898 (Sep. 24, 1991), "Mobile Platform For A Snow Plow", discloses a snow plow jack support adjustable on an angle to allow for different heights of attachment. Two tall guides allow the plow operator to position the plow in the proper location prior to dropping the plow onto the platform. This dolly places wheels directly below the snow plow jack support. It also has no lateral members for preventing a snow plow from sliding off.

The Internet also discloses several snow plow dollies having similar features as the patented devices described above. "Quickmount", at http://www.quickmountplowcart.com (Feb. 17, 2006), discloses a T-shaped snow plow dolly with an integrated jack lift. There are no members for preventing forward or lateral slippage. "Snow Plow Carts", at http://www.4qte.com/snowplow_carts.html (Feb. 17, 2006), discloses an H-shaped snow plow dolly having lateral channels to retain the snow plow blade and the snow plow jack. Wheels for positioning the device are located directly beneath the frame. "The Plow Buddy", at http://www.assoc-elec-prod-.com/PBBenefits.htm (Feb. 17, 2006), discloses a T-shaped snow plow dolly having an integral scissor jack for adjusting the height of the snow plow jack. It uses outriggers to raise the wheels and thus lower the frame, but has no lateral or front members to prevent slippage of the snow plow blade or snow plow jack. "Alan's Homegrown Plow Dollies", at http://www.snowplowing-contractors.com/plow_dollies.html (Feb. 17, 2006), discloses a T-shaped snow plow dolly having parallel lateral support members. The snow plow blade support member comprises front and rear lips to prevent the snow plow blade front falling off either forward or rearward, but does not comprise any lateral supports to retain the snow plow blade in place if lateral forces are applied. There is a platform for supporting a snow plow jack, but no lateral supports therefore. The wheels are located directly beneath the support frame.

Many of the disclosed devices comprise complicated mechanisms for adjusting the height of the snow plow supports. While some of the prior art discloses various means for preventing forward slippage of the snow plow blade, none discloses lateral members for prevention of sideways slippage of the snow plow blade or the snow plow jack. Most position the wheels or casters directly beneath the frame, thereby providing a higher center of gravity and less stability during movement. None of the prior art discloses a simple, inexpensive snow plow dolly having a low center of gravity for stability and front and lateral support members for securing a snow plow thereon without risk of front or lateral slippage during movement.

It is therefore an objective of the present invention to provide a low cost, easy to manufacture snow plow dolly having a low center of gravity.

It is a further objective to provide a low cost, easy to manufacture snow plow dolly having front support members to prevent forward slippage of the snow plow blade.

It is yet a further objective to provide a low cost, easy to manufacture snow plow dolly having lateral support members to prevent sideways slippage of the snow plow blade.

It is yet a further objective to provide a low cost, easy to manufacture snow plow dolly having lateral support members to prevent sideways slippage of the snow plow jack.

Other objectives of the present invention will be readily apparent from the description that follows.

SUMMARY OF THE INVENTION

The invention comprises a snow plow support frame and a positioning means for moving same. The support frame is comprised of three support members formed as an isosceles triangle, with the base of the triangle directed forward and suitably adapted to support a snow plow blade, and the apex of the triangle directed rearward. A fourth support member runs from the apex of the triangle to the center of the base of the triangle; this fourth support member is suitably adapted to support a snow plow jack. In the preferred embodiment the snow plow blade support member comprises upwardly depending planar retaining members, one along the front and two at each end, to prevent the snow plow blade from slipping forward or laterally, and the snow plow jack support member comprises upwardly depending planar retaining members, one along each lateral edge, to prevent the snow plow jack from slipping laterally.

In one embodiment the positioning means comprises at least two wheels, located at either end of the snow plow blade support member. In another embodiment the positioning means comprises casters instead of wheels. In the preferred embodiment a third wheel or caster is located at the apex of the triangle formed by the support members. In an alternative embodiment a skid may be located at the apex. The wheels may incorporate wheel locks to prevent movement of the snow plow dolly when movement is not desired. In the most preferred embodiment the wheels depend downward from lateral outriggers attached to the support frame at the corners of the triangle of the support frame, whereby the outriggers allow the support frame to be located below the tops of the wheels, thereby lowering the center of gravity of the device and making it more stable when positioning a snow plow.

Other features and advantages of the invention are described below.

DETAILED DESCRIPTION OF THE DRAWINGS

DETAILED DESCRIPTION OF THE INVENTION

Figure 1:
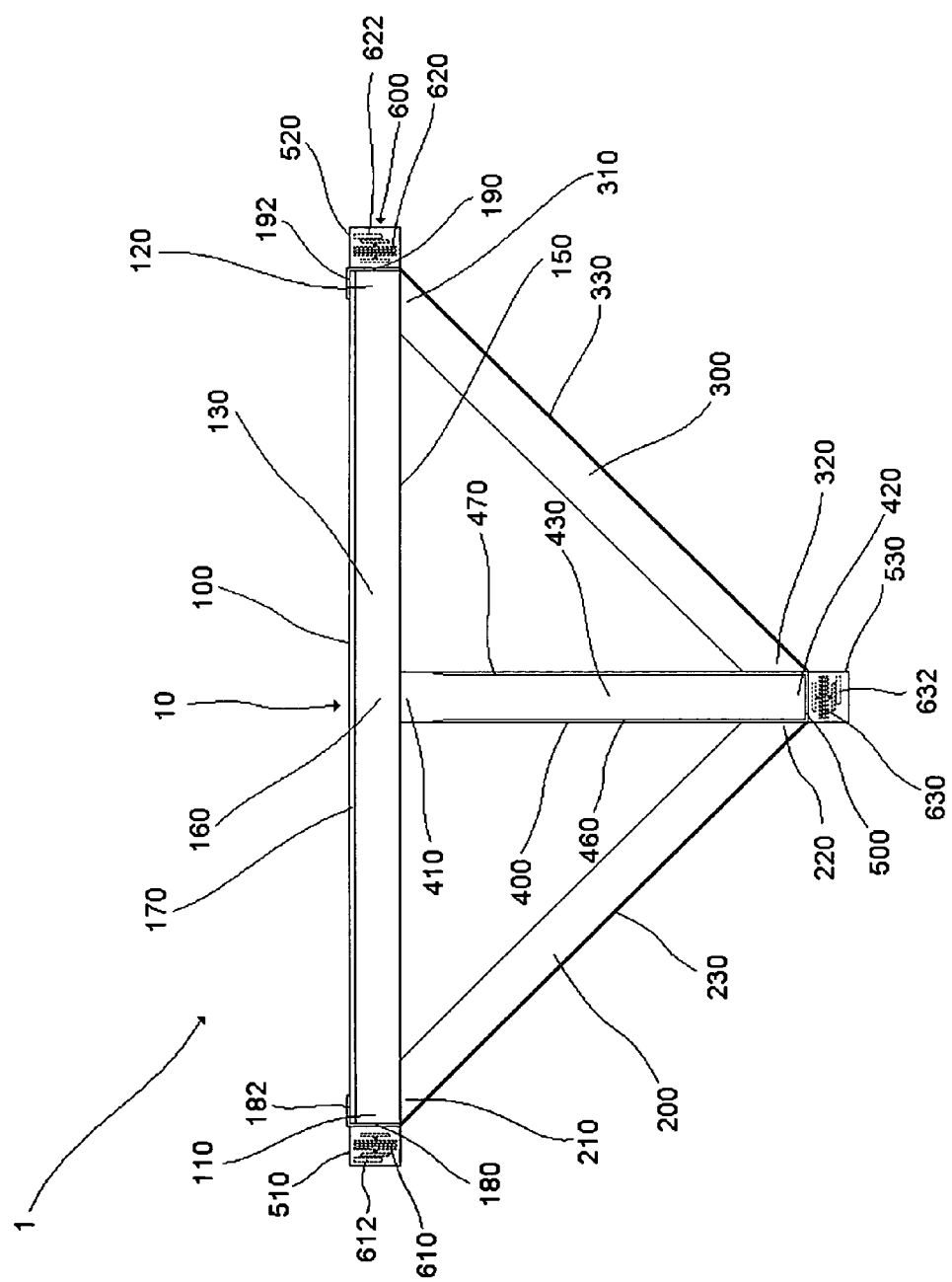
FIG. 1 is a top view of the snow plow dolly of the present invention, with wheels along the underside depicted in dotted line.
Figure 4:
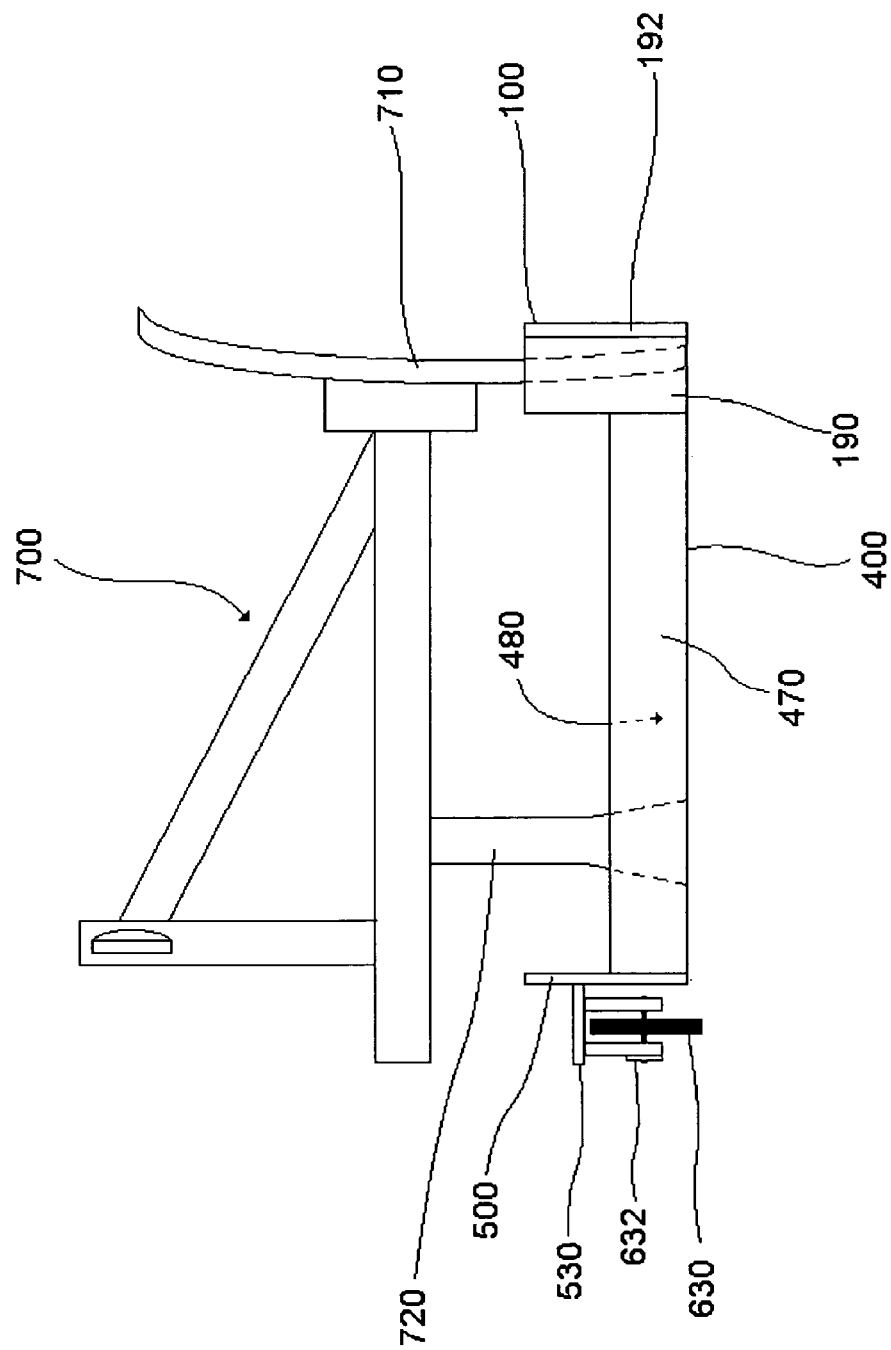
FIG. 4 is a side view of the present invention supporting a snow plow, with the bottom portion of the snow plow blade depicted in dotted line behind the second blade retention post and the second lateral support member deleted.

The improved snow plow dolly 1 of the present invention is intended to be used to support and position a standard snow plow 700, when the snow plow 700 is detached from its carrying vehicle. The snow plow 700 must have at least a snow plow blade 710 and a snow plow jack 720, with the snow plow jack 720 located along an axis substantially perpendicular with the plane of the snow plow blade 710. See FIG. 4. The present invention comprises two principal components, each presenting an improvement over the prior art: the support frame 10 and the positioning means 600. The support frame 10 is comprised of four subcomponents: the blade support member 100, two lateral support members 200,300, and the jack support member 400. See FIG. 1. The four subcomponents should be made of a structurally sturdy and rigid material. The preferred material is steel.

Figure 5:
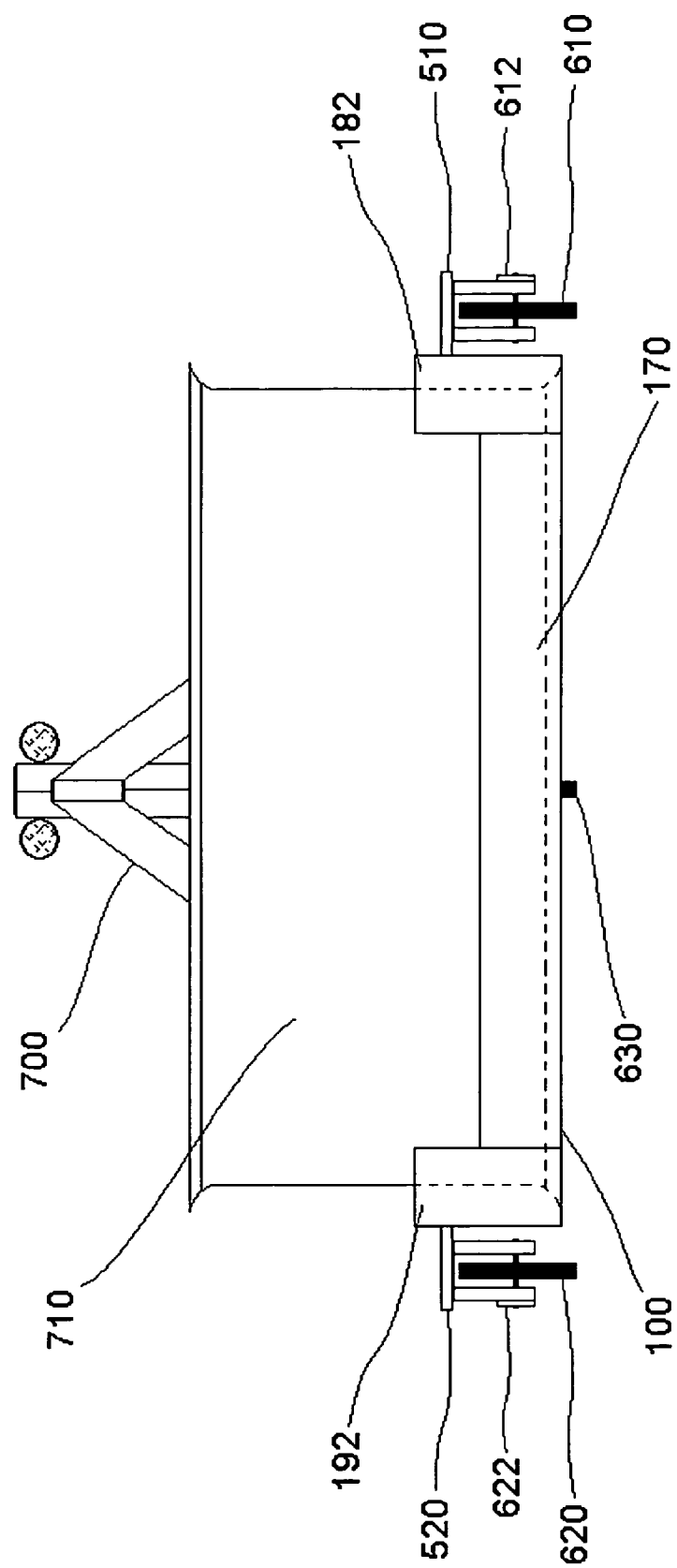
FIG. 5 is a front view of the present invention supporting a snow plow, with the bottom portion of the snow plow blade depicted in dotted line behind the blade retention front lip.

The blade support member 100 is an elongate beam oriented substantially horizontally in a plane substantially parallel to the ground. See FIGS. 1 and 5. The blade support member 100 is intended to support the snow plow blade 710, and thus is further oriented substantially parallel to the snow plow blade 710 and has a length greater than the width of a standard snow plow blade 710. The blade support member 100 has a first end 110 and a second end 120 located opposite the first end 110, and a central portion 160 located substantially equidistant between the first end 110 and the second end 120. The blade support member 100 has a top surface 130 facing away from the ground, upon which the snow plow blade 710 is rested. There are two edges 140,150 running along the longitudinal axis of the blade support member 100: the leading edge 140 and the trailing edge 150, with both edges 140,150 running from the first end 110 to the second end 120 of the blade support member 100. The trailing edge 150 is located parallel to and interior to the leading edge 140. See FIG. 1.

The first lateral support member 200 and the second lateral support member 300 are each elongate beams oriented substantially horizontally in the same plane as the blade support member 100. See FIG. 1. Each has a front end 210,310 and a back end 220,320. The front end 210 of the first lateral support member 200 is fixedly attached to the first end 110 of the blade support member 100 at an acute first angle to the blade support member 100. The front end 310 of the second lateral support member 300 is fixedly attached to the second end 120 of the blade support member 100 at an acute second angle to the blade support member 100, with the second angle being substantially equivalent to the first angle. The back ends 220, 320 of the first and second lateral support members 200,300 are fixedly attached to each other, thereby causing the blade support member 100 and the first and second lateral support members 200,300 to form a substantially isosceles triangle. See FIG. 1. The blade support member 100 and the first and second lateral support members 200,300 are fixedly attached to each other by any suitable means known in the art, for example by welds or by the use of fasteners, such as bolts.

The jack support member 400 is an elongate beam oriented substantially horizontally in the same plane as the blade support member 100 and the first and second lateral support members 200,300. It has a front end 410, a back end 420, a first edge 440 running from the front end 410 to the back end 420, and a second edge 450 running from the front end 410 to the back end 420 opposite the first edge 440. The front end 410 of the jack support member 400 is fixedly attached to the central portion 160 of the blade support member 100 along the trailing edge 150 of the blade support member 100, with the jack support member 400 oriented substantially perpendicular to the blade support member 100. The back end 420 of the jack support member 400 is fixedly attached to the back end 220 of the first lateral support member 200 and the back end 320 of the second lateral support member 300. See FIG. 1. The jack support member 400 is fixedly attached to the blade support member 100 and to the lateral support members 200,300 by any suitable means known in the art, for example by welds or by the use of fasteners, such as bolts.

Figure 3:
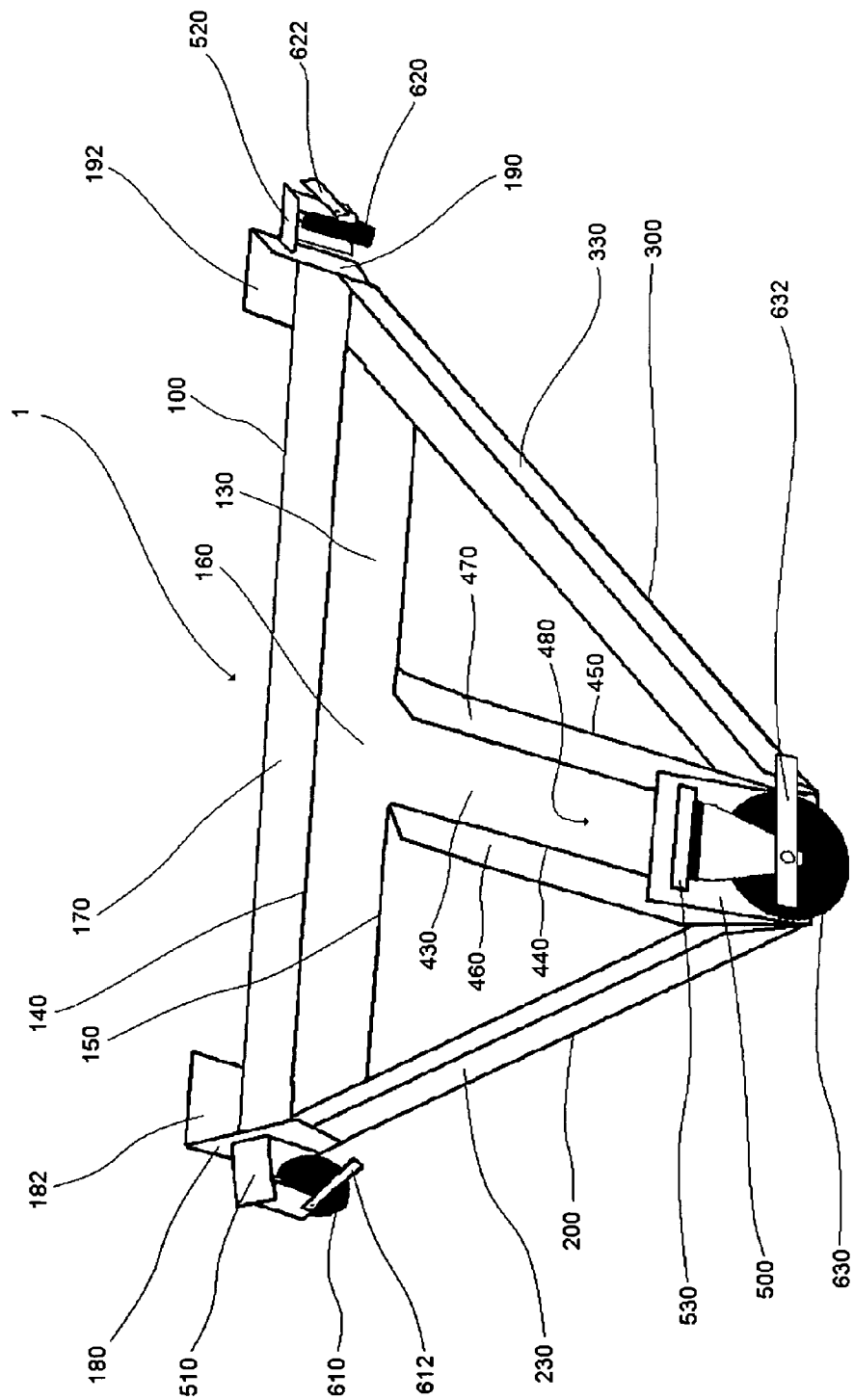
FIG. 3 is a perspective view of the present invention.

The jack support member 400 has a top surface 430 located between the first and second edges 440,450 and facing away from the ground, upon which the snow plow jack 720 is rested. The jack support member 400 is further comprised of a first jack retaining wall 460 and a second jack retaining wall 470. The first and second jack retaining walls 460,470 are substantially planar and each depends upward in a substantially vertical orientation, running along the first and second edges 440,450 of the jack support member 400, respectively, with the second jack retaining wall 470 substantially parallel to the first jack retaining wall 460. The first and second jack retaining walls 460,470 and the top surface 430 of the jack support member 400 form a jack support channel 480, into which the snow plow jack 720 is placed. See FIGS. 3 and 4.

Configured as such, the support frame 10 of the present invention is suitably adapted to securely support a snow plow 700, with the snow plow blade 710 positioned on the top surface 130 of the blade support member 100 and the snow plow jack 720 positioned within the jack support channel 480 of the jack support member 400. See FIGS. 4 and 5. The first and second jack retaining walls 460,470 of the jack support member 400 minimize lateral movement of the snow plow jack 720 and retain the snow plow jack 720 within the jack support channel 480, preventing the snow plow 700 from falling off the snow plow dolly 1. See FIG. 4. The jack support channel 480 represents a significant improvement over the prior art, which discloses jack support surfaces only, with no means for laterally securing a snow plow jack 720. While the substantial weight of a snow plow 700 will likely serve to retain it onto a snow plow dolly 1 when the snow plow dolly 1 is at rest, movement of the snow plow dolly 1 may cause lateral forces to shift the snow plow jack 720, as would vibrations resulting from positioning the snow plow dolly 1 over uneven surfaces, or even inadvertent contact with the snow plow 700. The jack support channel 480 of the present invention overcomes these shortcomings of the prior art.

Figure 2:
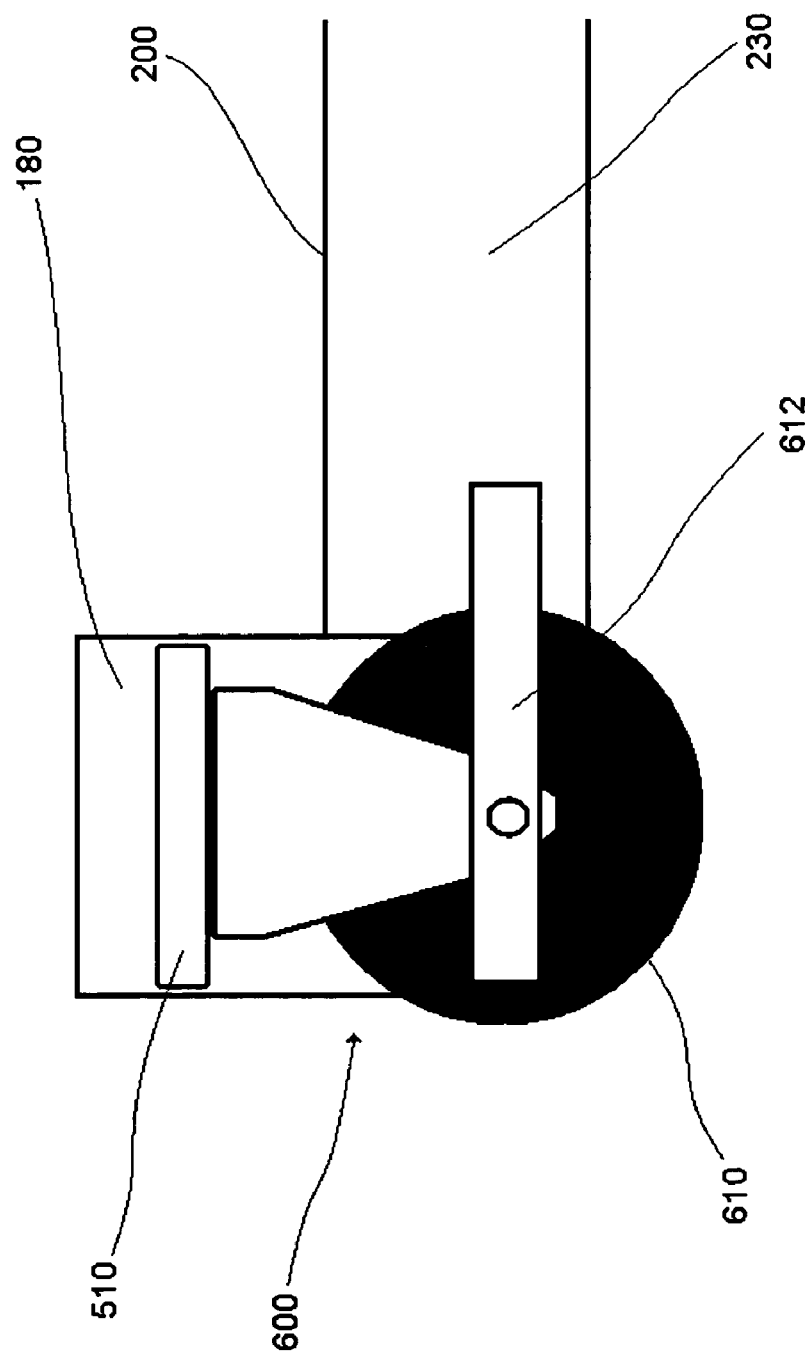
FIG. 2 is a side view of a portion of the positioning means of the present invention.

The second principal component of the present invention is the positioning means 600. See FIGS. 2 and 3. In one embodiment the positioning means 600 comprises a first wheel 610, located at the junction of the first end 110 of the blade support member 100 and the front end 210 of the first lateral support member 200, and a second wheel 620, located at the junction of the second end 120 of the blade support member 100 and the front end 310 of the second lateral support member 300. See FIGS. 1, 3, and 5. The first and second wheel 610,620 may pivot 360°, providing increased maneuverability to the present invention. Alternatively, first and second casters may be used in place of wheels. In the most preferred embodiment the support frame 10 comprises first and second outriggers 510,520 to support the positioning means 600. See FIG. 3. The first outrigger 510 is located at the junction of the first end 110 of the blade support member 100 and the front end 210 of the first lateral support member 200, is substantially planar and oriented substantially horizontally. The second outrigger 520 is located at the junction of the second end 120 of the blade support member 100 and the front end 310 of the second lateral support member 300, and is also substantially planar and oriented substantially horizontally. The first wheel 610 is attached to the first outrigger 510 such that the first wheel 610 depends downward from the first outrigger 510 to the extent that one portion of the first wheel 610 is at an elevation above the front end 210 of the first lateral support member 200 while another portion of the first wheel 610 is at an elevation below the front end 210 of the first lateral support member 200. The second wheel 620 is attached to the second outrigger 520 in a like manner. See FIGS. 3 and 5. If casters are used, they are attached to the outriggers 510,520 in the same manner. As such, the support frame 10 of the present invention rides lower to the ground than snow plow dollies of the prior art, which place wheels beneath the support frame. This lowering of the support frame 10 in the present invention results in a lower center of gravity of the snow plow 700 when it is placed on the support frame 10, providing greater stability when positioning the snow plow dolly 1. Further increasing the security of the present invention, the first wheel 610 may comprise a first wheel lock 612, suitably adapted to prevent the first wheel 610 from rolling. The second wheel 620 may also comprise a second wheel lock 622. See FIG. 3.

In the preferred embodiment the positioning means 600 further comprises a third wheel 630, located at the junction of the back end 220 of the first lateral support member 200 and the back end 320 of the second lateral support member 300. See FIG. 3. The third wheel 630 may pivot 360°. A third caster may be substituted for the third wheel 630, or even a skid. A third outrigger 530 may be attached to a rear support post 500 located at the junction of the back ends 220,320 of the first and second lateral support members 200,300. The rear support post 500 is substantially planar and depends upward in a substantially vertical orientation. The third outrigger 530 is substantially planar and oriented substantially horizontally. See FIG. 3. The third wheel 630 is attached to the third outrigger 530 in a like manner as the first and second wheels 610,620 are attached to the first and second outriggers 510, 520, respectively. If a third caster is used instead of a third wheel 630, it is attached to the third outrigger 530 in the same manner. The third wheel 630 may comprise a third wheel lock 632. See FIG. 3.

Other embodiments of the present invention provide additional security when the snow plow 700 is placed on the snow plow dolly 1. In one embodiment, the blade support member 100 of the support frame 10 further comprises a blade retention front lip 170. See FIGS. 3 and 5. The blade retention front lip 170 is substantially planar and depends upward in a substantially vertical orientation, running along the leading edge 140 of the blade support member 100 from the first end 110 of the blade support member 100 to the second end 120 of the blade support member 100. The blade retention front lip 170 serves to prevent the snow plow blade 710 from moving forward off the blade support member 100. In another embodiment the blade support member 100 further comprises a first blade retention post 180 and a second blade retention post 190. See FIGS. 1 and 3. The first blade retention post 180 is substantially planar and depends upward in a substantially vertical orientation. It is located at the first end 110 of the blade support member 100 and oriented substantially perpendicular to the blade retention front lip 170. The second blade retention post 190 is configured in a like manner and located at the second end 120 of the blade support member 100. The first and second blade retention posts 180,190 prevent the snow plow blade 710 from shifting laterally off the blade support member 100. The first and second blade retention posts 180,190 may also comprise front flanges 182,192, which form right angles with the first and second blade retention posts 180,190, thereby adding strength to the connection of the first and second blade retention posts 180,190 to the blade retention front lip 170. See FIGS. 1 and 3. In another embodiment the first and second lateral support members 200,300 further comprise side flanges 230,330, with each side flange 230,330 created by forming a right angle in the respective lateral support members 200,300. See FIG. 3. The side flanges 230,330 depend upward in a substantially vertical orientation. The side flanges 230,330 increase the strength of the respective lateral support members 200,300.

Other embodiments not specifically set forth herein are also within the scope of the following claims.

I claim:

1. A snow plow dolly comprising
a support frame, said support frame having
    a blade support member, said blade support member being an elongate beam oriented substantially horizontally, with
        a first end,
        a second end, located opposite the first end,
        a central portion, located between the first end and the second end and substantially equidistant from the first end and the second end,
        a top surface,
        a leading edge, said leading edge running from the first end to the second end of the blade support member, and
        a trailing edge, said training edge running from the first end to the second end of the blade support member and located parallel to and opposite the leading edge;
    a first lateral support member, said first lateral support member being an elongate beam oriented substantially horizontally, with
        a front end, and
        a back end, located opposite the front end;
    a second lateral support member, said second lateral support member being an elongate beam oriented substantially horizontally, with
        a front end, and
        a back end, located opposite the front end;
    a jack support member, said jack support member being an elongate beam oriented substantially horizontally, with
        a front end,
        a back end, located opposite the front end,
        a top surface,
        a first edge, said first edge running from the front end to the back end of the jack support member,
        a second edge, said second edge running from the front end to the back end of the jack support member and located parallel to and opposite the first edge,
        a first jack retaining wall, said first jack retaining wall being substantially planar and depending upward in a substantially vertical orientation, running along the first edge of the jack support member, and
        a second jack retaining wall, said second jack retaining wall being substantially planar and depending upward in a substantially vertical orientation, running along the second edge of the jack support member substantially parallel to said first jack retaining wall of the jack support member,
    whereby the first and second jack retaining walls and the top surface of the jack support member form a jack support channel; and
    a positioning means, said positioning means suitably adapted to position the support frame;
wherein the first end of the blade support member is adjacent to and fixedly attached to the front end of the first lateral support member, with the blade support member and the first lateral support member forming a first angle,
the second end of the blade support member is adjacent to and fixedly attached to the front end of the second lateral support member, with the blade support member and the second lateral support member forming a second angle, said second angle substantially equivalent to the first angle,
the back end of the first lateral support member is adjacent to and fixedly attached to the back end of the second lateral support member,
the front end of the jack support member is adjacent to and fixedly attached to the central portion of the blade support member along the trailing edge of the blade support member, with the jack support member oriented substantially perpendicular to the blade support member, and
the back end of the jack support member is adjacent to and fixedly attached to the back end of the first lateral support member and the back end of the second lateral support member,
with the blade support member, the first lateral support member, and the second lateral support member forming an isosceles triangle,
such that the support frame may support a snow plow, said snow plow having a snow plow blade and a snow plow jack, with the snow plow blade positioned on the top surface of the blade support member of the support frame and the snow plow jack positioned within the jack support channel of the jack support member of the support frame.

2. The snow plow dolly of claim 1 wherein the blade support member of the support frame further comprises
    a blade retention front lip, said blade retention front lip being substantially planar and depending upward in a substantially vertical orientation, running along the leading edge of the blade support member from the first end of the blade support member to the second end of the blade support member.

3. The snow plow dolly of claim 1 wherein the positioning means comprises
    a first wheel, located at the junction of the first end of the blade support member and the front end of the first lateral support member; and
    a second wheel, located at the junction of the second end of the blade support member and the front end of the second lateral support member.

4. The snow plow dolly of claim 2 wherein the blade support member of the support frame further comprises
    a first blade retention post, said first blade retention post being substantially planar and depending upward in a substantially vertical orientation, located at the first end of the blade support member and oriented substantially perpendicular to the blade retention front lip; and
    a second blade retention post, said second blade retention post being substantially planar and depending upward in a substantially vertical orientation, located at the second end of the blade support member and oriented substantially perpendicular to the blade retention front lip.

5. The snow plow dolly of claim 2 wherein
the first lateral support member further comprises a side flange, said side flange of the first lateral support member created by forming a right angle in the first lateral support member, with said side flange of the first lateral support member depending upward in a substantially vertical orientation; and the second lateral support member further comprises a side flange, said side flange of the second lateral support member created by forming a right angle in the second lateral support member, with said side flange of the second lateral support member depending upward in a substantially vertical orientation.

6. The snow plow dolly of claim 4 wherein the first blade retention post further comprises
   a front flange, said front flange of the first blade retention post created by forming a right angle in the first blade retention post, with said front flange of the first blade retention post aligned with and adjacent to the blade retention front lip; and
   the second blade retention post further comprises a front flange, said front flange of the second blade retention post created by forming a right angle in the second blade retention post, with said front flange of the second blade retention post aligned with and adjacent to the blade retention front lip.

7. The snow plow dolly of claim 6 wherein
   the first lateral support member further comprises a side flange, said side flange of the first lateral support member created by forming a right angle in the first lateral support member, with said side flange of the first lateral support member depending upward in a substantially vertical orientation; and
   the second lateral support member further comprises a side flange, said side flange of the second lateral support member created by forming a right angle in the second lateral support member, with said side flange of the second lateral support member depending upward in a substantially vertical orientation.

8. The snow plow dolly of claim 3 wherein the support frame further comprises
   a first outrigger, said first outrigger being substantially planar and oriented substantially horizontally, said first outrigger being located at the junction of the first end of the blade support member and the front end of the first lateral support member, with the first wheel attached to the first outrigger such that the first wheel depends downward from the first outrigger to the extent that a portion of the first wheel is at an elevation above the front end of the first lateral support member while a different portion of the first wheel is at an elevation below the front end of the first lateral support member; and
   a second outrigger, said second outrigger being substantially planar and oriented substantially horizontally, said second outrigger being located at the junction of the second end of the blade support member and the front end of the second lateral support member, with the second wheel attached to the second outrigger such that the second wheel depends downward from the second outrigger to the extent that a portion of the second wheel is at an elevation above the front end of the second lateral support member while a different portion of the second wheel is at an elevation below the front end of the second lateral support member.

9. The snow plow dolly of claim 3 wherein the positioning means further comprises a third wheel, located at the junction of the back end of the first lateral support member and the back end of the second lateral support member.

10. The snow plow dolly of claim 8 wherein
    the first wheel rotates three hundred sixty degrees about a vertical axis of the first wheel; and
    the second wheel rotates three hundred sixty degrees about a vertical axis of the second wheel.

11. The snow plow dolly of claim 8 wherein the first wheel comprises a first wheel lock, whereby the first wheel lock is suitably adapted to prevent the first wheel from rolling.

12. The snow plow dolly of claim 8 wherein
    the positioning means further comprises
       a third wheel, located at the junction of the back end of the first lateral support member and the back end of the second lateral support member; and
    the support frame further comprises
       a third outrigger, said third outrigger being substantially planar and oriented substantially horizontally, said third outrigger being located at the junction of the back end of the first lateral support member and the back end of the second lateral support member, with the third wheel attached to the third outrigger such that the third wheel depends downward from the third outrigger to the extent that a portion of the third wheel is at an elevation above the back end of the first lateral support member while a different portion of the third wheel is at an elevation below the back end of the first lateral support member.

13. The snow plow dolly of claim 11 wherein the second wheel comprises a second wheel lock, whereby the second wheel lock is suitably adapted to prevent the second wheel from rolling.

14. The snow plow dolly of claim 12 wherein the third wheel rotates three hundred sixty degrees about a vertical axis of the third wheel.

15. The snow plow dolly of claim 12 wherein the third wheel comprises a third wheel lock, whereby the third wheel lock is suitably adapted to prevent the third wheel from rolling.

16. The snow plow dolly of claim 12 wherein
    the blade support member of the support frame further comprises
       a blade retention front lip, said blade retention front lip being substantially planar and depending upward in a substantially vertical orientation, running along the leading edge of the blade support member from the first end of the blade support member to the second end of the blade support member,
       a first blade retention post, said first blade retention post being substantially planar and depending upward in a substantially vertical orientation, located at the first end of the blade support member and oriented substantially perpendicular to the blade retention front lip, and
       a second blade retention post, said second blade retention post being substantially planar and depending upward in a substantially vertical orientation, located at the second end of the blade support member and oriented substantially perpendicular to the blade retention front lip; and
    the support frame further comprises
       a rear support post, said rear support post being substantially planar and depending upward in a substantially vertical orientation, located at the junction of the back end of the first lateral support member and the back end of the second lateral support member;
    wherein the first outrigger is fixedly attached to the first blade retention post and oriented substantially perpendicular to the first blade retention post,
    the second outrigger is fixedly attached to the second blade retention post and oriented substantially perpendicular to the second blade retention post, and the third outrigger is fixedly attached to the rear support post and oriented substantially perpendicular to the rear support post.

17. The snow plow dolly of claim 16 wherein the first wheel rotates three hundred sixty degrees about a vertical axis of the first wheel;

the second wheel rotates three hundred sixty degrees about a vertical axis of the second wheel; and the third wheel rotates three hundred sixty degrees about a vertical axis of the third wheel.

18. The snow plow dolly of claim 17 wherein the first wheel comprises a first wheel lock;

the second wheel comprises a second wheel lock; and the third wheel comprises a third wheel lock;

whereby the first, second, and third wheel locks are suitably adapted to prevent the first, second, and third wheels, respectively, from rolling.

* * * * *